US008002505B2

(12) United States Patent
Laney et al.

(10) Patent No.: US 8,002,505 B2
(45) Date of Patent: Aug. 23, 2011

(54) TIE DOWN ASSEMBLY FOR A VEHICLE

(76) Inventors: Therin Laney, Shelton, WA (US);
Steven Swearingen, Shelton, WA (US)

( * ) Notice: Subject to any disclaimer, the term of this patent is extended or adjusted under 35 U.S.C. 154(b) by 616 days.

(21) Appl. No.: 12/032,614

(22) Filed: Feb. 15, 2008

(65) Prior Publication Data

US 2009/0208306 A1 Aug. 20, 2009

(51) Int. Cl.
*B61D 45/00* (2006.01)
(52) U.S. Cl. ........................................................ 410/101
(58) Field of Classification Search .................. 410/100, 410/101, 103, 77, 97, 96, 102, 106, 116, 410/117
See application file for complete search history.

(56) References Cited

U.S. PATENT DOCUMENTS

| 3,544,705 | A | * | 12/1970 | Winston | 174/75 C |
| 5,887,840 | A | | 3/1999 | Hoffman | |
| 6,280,128 | B1 | * | 8/2001 | Schrader | 410/97 |
| 6,503,035 | B1 | * | 1/2003 | Perrott | 410/23 |
| 6,729,815 | B2 | * | 5/2004 | Hornady | 410/47 |
| 6,758,643 | B1 | * | 7/2004 | Hsieh | 410/85 |
| 6,957,938 | B1 | * | 10/2005 | Beasley | 410/100 |
| 7,214,014 | B2 | * | 5/2007 | Stanley | 410/97 |
| 7,219,951 | B2 | | 5/2007 | Rasmussen | |
| 2003/0103831 | A1 | * | 6/2003 | Alderman | 410/100 |
| 2003/0201377 | A1 | | 10/2003 | Davis | |

FOREIGN PATENT DOCUMENTS

EP 0255281 A2 2/1988

OTHER PUBLICATIONS

International Search Report and Written Opinion mailed Aug. 18, 2009, issued in corresponding International Application No. PCT/US2009/031825, filed Jan. 23, 2009.

* cited by examiner

*Primary Examiner* — Glenn Dayoan
*Assistant Examiner* — SunSurraye Westbrook
(74) *Attorney, Agent, or Firm* — Christensen O'Connor Johnson Kindness PLLC

(57) ABSTRACT

A tie down assembly for a vehicle is provided. The tie down assembly includes a retention body and an anchor assembly. The anchor assembly is slidably disposed within the retention body for reciprocating movement between a release position and a restraint position. The tie down assembly also includes a stop secured to the anchor assembly. The stop is positioned on the anchor assembly for releasably locking with a portion of the retention body when the anchor assembly is in the restraint position.

16 Claims, 3 Drawing Sheets

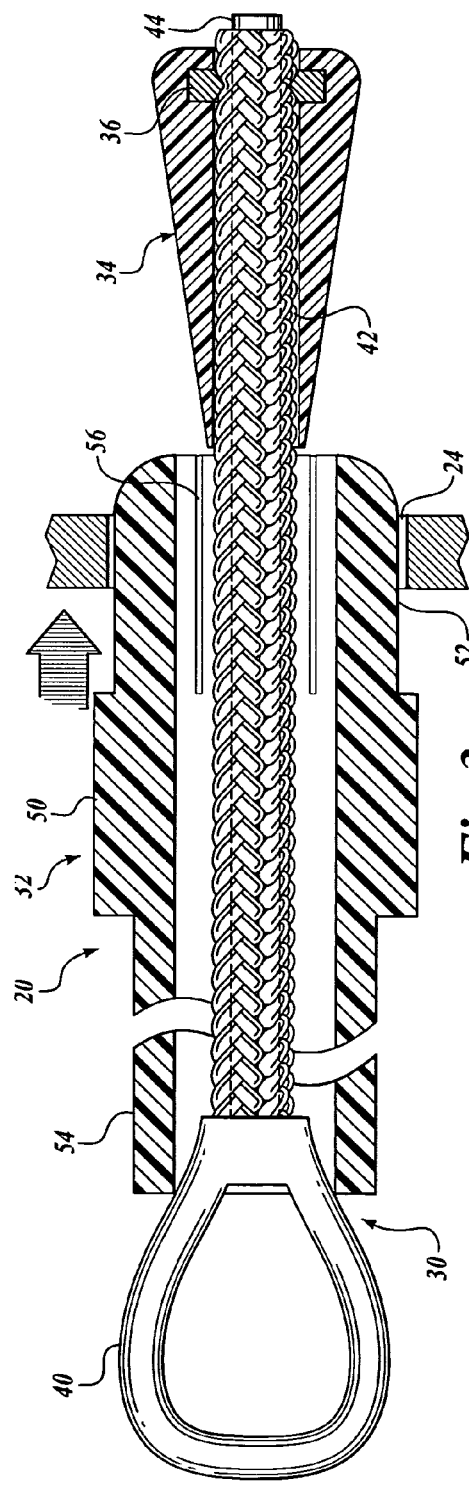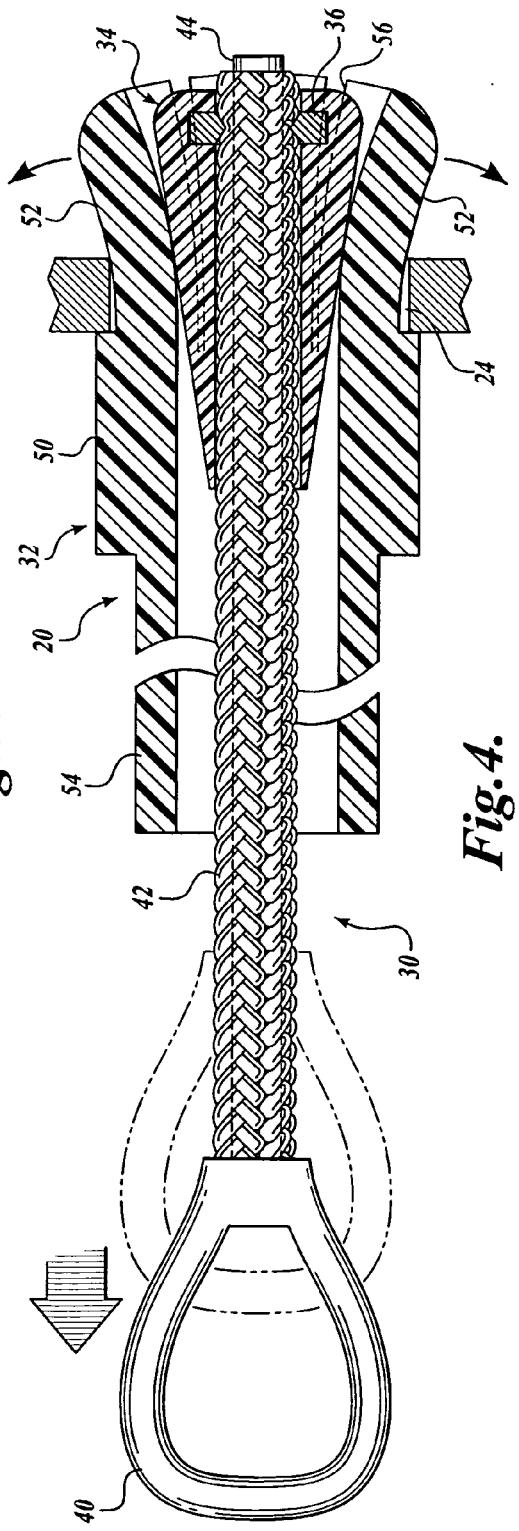

TIE DOWN ASSEMBLY FOR A VEHICLE

BACKGROUND

Utility and recreation vehicles, including pick-up trucks and medium weight flat bed trucks, often include a bed having partial sidewalls. Such sidewalls extend at least three feet from the floor of the bed. To accommodate loads requiring higher sidewalls, a plurality of post bores are positioned along the length of the sidewalls. These post bores are sized to receive a post forming extensions of the sidewalls. When not in use, such post bores include a drill port located in the bottom of the post bores to permit drainage.

Regardless of whether the bed of such vehicles include sidewall extensions, it is becoming more commonplace for states to enact laws requiring loads be secured within the bed. In the past, load binding cables were often strung between the post bores of opposing sidewalls and were secured to the post bores by a clip, such as an S-shaped clip, attached to opposite ends of the load binding cables. In other arrangements, the ends of load binding cables were either tied to opposite sides of the beds or where attached to an overhang located at the top of opposed sidewalls. Although effective, existing methods of attaching such load binding cables to the bed of a vehicle are not without their problems.

As an example, the clip of the load binding cable may slip from its attachment point to the bed. In other examples, tying the ends of the load binding cables to opposing sidewalls did not provide a secure coupling of the load binding cable to the sidewalls. As such, there exists a need for a low cost and effective tie down assembly for a vehicle.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A tie down assembly for a vehicle is provided. The tie down assembly includes a retention body and an anchor assembly. The anchor assembly is slidably disposed within the retention body for reciprocating movement between a release position and a restraint position. The tie down assembly also includes a stop secured to the anchor assembly. The stop is positioned on the anchor assembly for releasably locking with a portion of the retention body when the anchor assembly is in the restraint position.

DESCRIPTION OF THE DRAWINGS

The foregoing aspects and many of the attendant advantages of this invention will become better understood by reference to the following detailed description, when taken in conjunction with the accompanying drawings, wherein:

FIG. 3 is a cross-sectional side planar view of the tie down assembly of FIG. 1, showing the tie down assembly is a release position; and FIG. 4 is a cross-sectional side planar view of the tie down assembly of FIG. 3, showing the tie down assembly is a restraint position.

DETAILED DESCRIPTION

Figure 1:
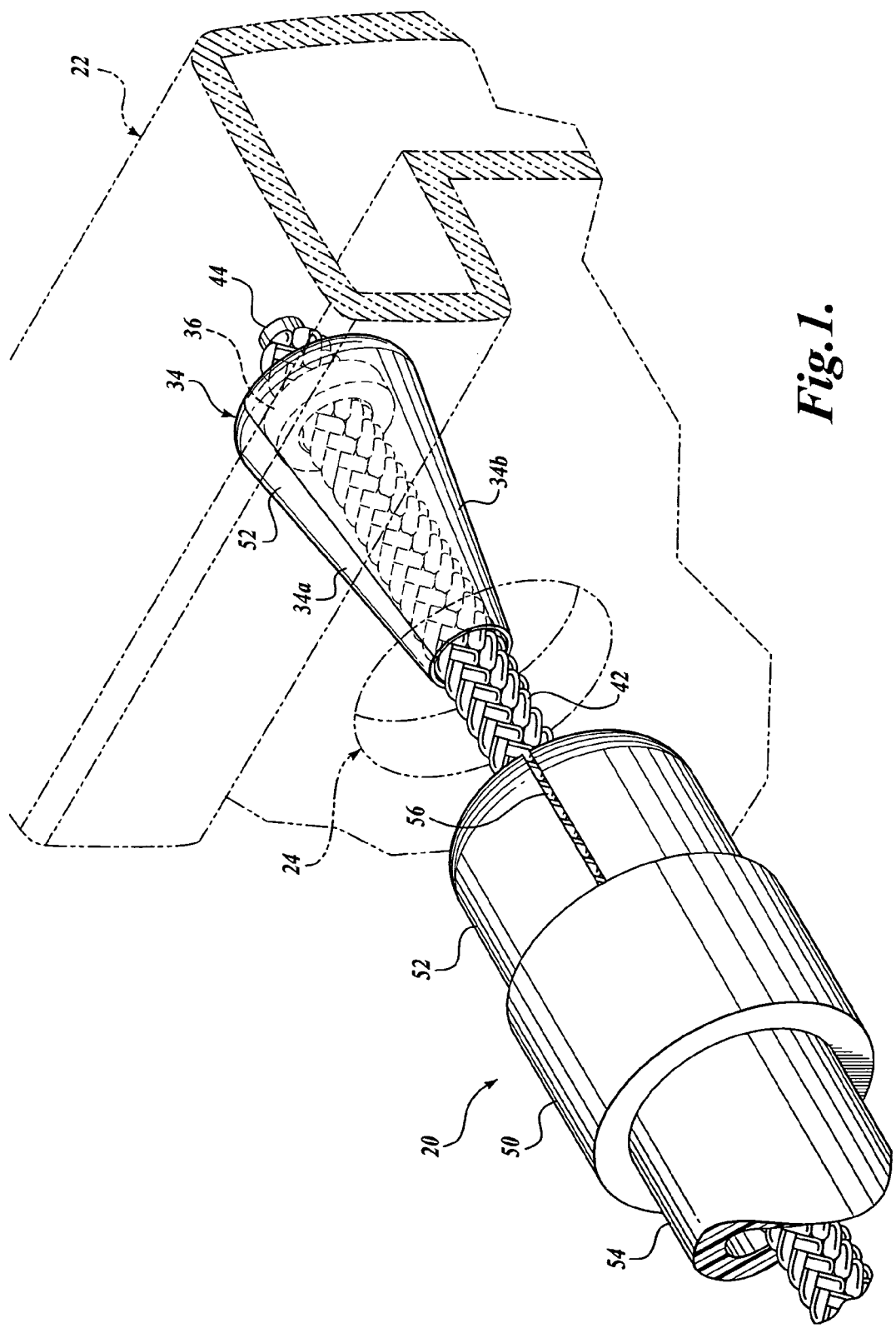
FIG. 1 is an isometric view of a tie down assembly constructed in accordance with one embodiment of the present disclosure.

A tie down assembly 20 constructed in accordance with one embodiment of the present disclosure may be best understood by referring to FIGS. 1-4. The tie down assembly 20 is illustrated and referenced with respect to providing a portable anchor point of a vehicle (not shown) having sidewalls 22. Such well-known sidewalls 22 include an attachment bore 24 located either within the sidewall 22 itself or within a post bore (not shown) extending vertically through the top of the sidewall 22. It should be apparent that the location of the attachment bore 24 is for illustrative purposes only and is not intended to be limiting.

The tie down assembly 20 includes an anchor assembly 30, a retention body 32, and a stop 34. The anchor assembly 30 includes an eyelet 40 and a cord section 42. The well-known eyelet 40 is either integrally formed with one end of the cord section 42 or is attached to the end of the cord section by any well-known manner, such as crimping.

The cord section 42 is suitably manufactured from a braided material or may be a section of solid material, such as plastic. Disposed in an end of the cord section 42 opposite from the eyelet 40 is a stiffening member 44. The stiffening member 44, which is optional, is used to assist in stiffening the cord section 42 as the anchor assembly 30 is reciprocated between a release position and a restraint position, as described in greater detail below.

The stop 34 is suitably manufactured from a high strength multiple plastic material, such as polyvinyl chloride. In one embodiment, the stop 34 is bell-shaped in configuration, such that the stop increases is cross-sectional diameter along an axis extending longitudinally through the stop 34 from a first diameter to a second diameter. As a non-limiting example, the stop 34 increases from a smaller diameter to a larger diameter, thereby resulting in the bell-shaped configuration.

The stop 34 is disposed on the end of the cord section 42 opposite from the eyelet 40 in any well-known manner, such as molding the stop 34 around the cord section 42. In another embodiment, the stop 34 includes first and second housings 34a and 34b secured in placed by an o-ring 36. As disposed on the cord section 42, the smaller diameter portion is positioned toward the eyelet 40 and, therefore, increases in diameter, such that the stop 34 translates into the retention body 32, narrow end first.

The retention body 32 includes a collar 50 and a gripping portion 52. The collar 50 and gripping portion 52 are suitably integrally formed from a plastic, such as polyvinyl chloride. Although a retention body 32 having an integrally formed collar section 50 and a gripping portion 52 is preferred, other embodiments, such as an embodiment that includes separately formed collars and gripping portions press fitted together, are also within the scope of the present disclosure.

Figure 2:
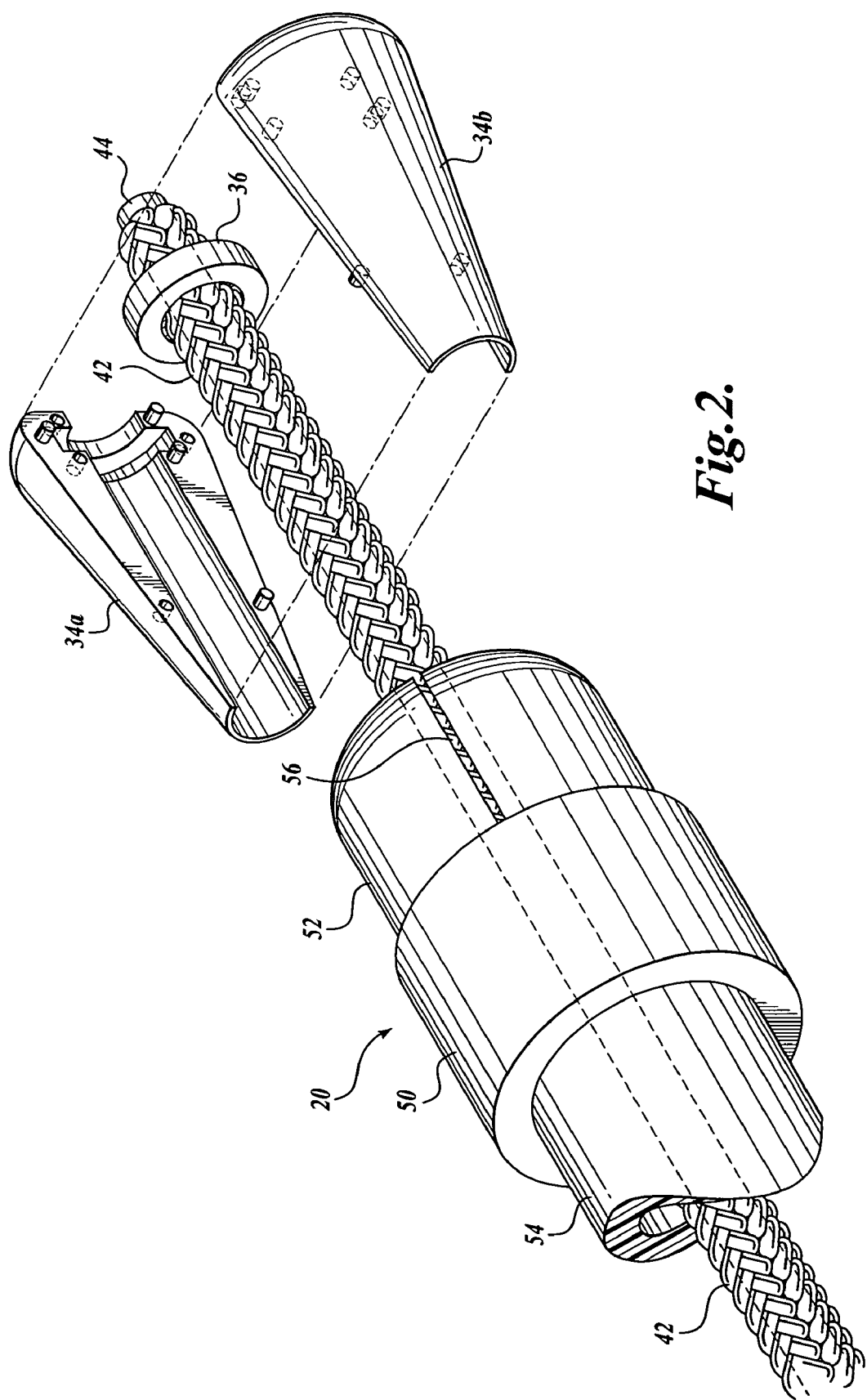
FIG. 2 is a partially exploded isometric view of the tie down assembly of FIG. 1.

As may be best seen by referring to FIGS. 1 and 2, the gripping portion 52 includes a plurality of splits 56 to allow the gripping portion 52 to be splayed radially as the anchor assembly 30 is translated within the retention body 32.

The retention body 32 may include an optional shank portion 54 either integrally formed or press fitted into the collar 50 on a side of the collar 50 opposite of the gripping portion 52. The optional shank portion 54 is used to assist in retaining the retention body 32 against the attachment bore 24 as the anchor assembly 30 is reciprocated between the release and the restraint positions.

Operation of the tie down assembly 20 may be best understood by referring to FIGS. 3 and 4. In operation, the stop 34 and gripping portion 52 are inserted into the attachment bore 24 of the vehicle. After the tie down assembly 20 is inserted into the attachment bore 24, an operator pulls with one hand on the eyelet 40 to translate the anchor assembly within the retention body in a first direction causing the stop 34 to be pulled inwardly of the gripping portion 52. At the same time, the retention body 32 is held with the other free hand of the operator within the attachment bore 24 and the operator continues to pull on the cord section 42 to securely draw the stop 34 within the gripping portion 52. This action causes the gripping portion to splay radially and, therefore, adjustable to resist movement of the stop 34 as it translates in the first direction.

The radial splaying action of the gripping portion 52 against the perimeter of the attachment bore 24 causes the gripping portion 52 to be in an interference fit with the attachment bore 24 to restrain the gripping portion 52 within the attachment bore 24. Further, the stop 34 creates an interference fit with the gripping portion 52 to resist further movement of the stop 34 as it translates in the first direction. Because of the pinching action between the gripping portion 52 and the stop 34 against the perimeter of the attachment bore 24, the anchor assembly 20, in this restraint position, is prevented from further translation relative to the retention body 32. As such, a rope or other load binding member may be looped through and attached to the eyelet 40, thereby defining a convenient, removable tie down assembly 20 for a vehicle.

To release the tie down assembly 20 from the restraint position, the cord section 42 is translated within the retention body 32 toward the vehicle, thereby pushing the stop 34 outwardly from within the gripping portion 52 and decreasing the diameter of the gripping portion 52 such that the entire anchor assembly 20 may be withdrawn from the attachment bore 24.

While illustrative embodiments have been illustrated and described, it will be appreciated that various changes can be made therein without departing from the spirit and scope of the invention.

The invention claimed is:

1. A tie down assembly for a vehicle, the tie down assembly comprising:
   (a) a retention body having an interior;
   (b) an anchor assembly slidably disposed within the retention body for reciprocating movement between a release position and a restraint position; and
   (c) a stop secured to the anchor assembly, the stop positioned on the anchor assembly for releasably locking within an interior portion of the retention body when the anchor assembly is in the restraint position to increase the diameter of a portion of the retention body.

2. The tie down assembly of claim 1, wherein the stop defines an interference fit with the portion of the retention body to prevent the anchor assembly from sliding within the retention body in a first direction.

3. The tie down assembly of claim 1, wherein the stop limits movement of the anchor assembly in a first direction and permits movement in a second direction opposite from the first direction.

4. The tie down assembly of claim 2, wherein the retention body includes a collar portion and a gripping portion, the gripping portion being adjustable to resist movement of the stop as it translates in the first direction and the stop engages the retention body.

5. The tie down assembly of claim 4, wherein the stop increases in diameter along an axis extending through a longitudinal direction of the stop from a first diameter to a second diameter.

6. The tie down assembly of claim 5, wherein the stop is releasably seated within the gripping portion when the anchor assembly is in the restraint position to prevent further movement of the stop in the first direction.

7. The tie down assembly of claim 1, wherein the anchor assembly further includes an eyelet secured to an end of the anchor assembly.

8. The tie down assembly of claim 1, further comprising a stiffening member disposed within the anchor assembly near the stop to assist in reciprocably translating the anchor assembly between the release and restraint positions.

9. A tie down assembly for a vehicle, the tie down assembly comprising:
   (a) a retention body having a gripping portion with an interior;
   (b) an anchor assembly slidably disposed within the retention body for reciprocating movement between a release position, wherein the gripping portion defines a first diameter, and a restraint position, wherein the gripping portion defines a second diameter; and
   (c) a stop secured to the anchor assembly, the stop positioned on the anchor assembly such that when the anchor assembly is moved into the restraint position, the stop is at least partially received within the interior of the gripping portion to transition the gripping portion into the second diameter.

10. The tie down assembly of claim 9, wherein the stop defines an interference fit with the gripping portion to limit movement of the anchor assembly when the anchor assembly is in the restraint position and the tie down assembly is coupled to a portion of a vehicle.

11. The tie down assembly of claim 9, wherein the anchor assembly includes an eyelet secured to an end of the anchor assembly.

12. The tie down assembly of claim 9, further comprising a stiffening member disposed within the anchor assembly to assist in reciprocably translating the anchor assembly between the release and restraint positions.

13. A tie down assembly for a vehicle, the tie down assembly comprising:
   (a) a retention body having a gripping portion with an interior, the gripping portion sized and configured to be releasably coupled to an attachment bore of a vehicle, the attachment bore having a bore diameter;
   (b) an anchor assembly slidably disposed within the retention body for reciprocating movement between a release position, wherein the gripping portion defines a first diameter, and a restraint position, wherein the gripping portion defines a second diameter, wherein the second diameter is greater than the bore diameter to selectively define an interference fit between the gripping portion and the attachment bore when the tie down assembly is coupled to the vehicle and the anchor assembly is in the restraint position; and (c) a stop secured to the anchor assembly, the stop positioned on the anchor assembly such that when the anchor assembly is moved into the restraint position, the stop is at least partially received within the interior of the gripping portion to transition the gripping portion into the second diameter.

14. The tie down assembly of claim 13 wherein the anchor assembly includes an eyelet secured to an end of the anchor assembly.

15. The tie down assembly of claim 14, further comprising a stiffening member disposed within the anchor assembly to assist in reciprocably translating the anchor assembly between the release and restraint positions.

16. The tie down assembly of claim 1, further comprising one or more axial slits formed in the portion of the retention body.

* * * * *